Patented Nov. 14, 1950

2,529,911

UNITED STATES PATENT OFFICE 2,529,911

COPOLYMERS OF ACRYLONITRILE AND N-ALLYL AND N-2-METHALLYL CYANIDES

John R. Caldwell, Kingsport, Tenn., assignor to Eastman Kodak Company, Rochester, N. Y., a corporation of New Jersey No Drawing. Application January 6, 1950, Serial No. 137,258

12 Claims. (Cl. 260—85.5)

This invention relates to copolymers of acrylonitrile with N-allyl cyanide and with N-2-methallyl cyanide, in which the major portion by weight of the copolymer is acrylonitrile.

It is known that acrylonitrile homopolymerizes to a high molecular weight resinous compound which is characterized by poor solubility, excessive brittleness and very high softening point making difficult the shaping of materials therefrom, as in compression and injecting molding processes and as in extrusion processes wherein the resin molecules are oriented so as to be parallel with the major surface, for example, in the production of filaments, fibers, yarns, etc. The filaments produced from polyacrylonitrile tend to be porous, spongy, weak or brittle, or have a discontinuous structure. On the other hand, N-allyl and N-2-methallyl cyanides cannot be homopolymerized to high molecular weight resinous polymers by the usual polymerization catalysts. I have now found, however, that certain proportions of acrylonitrile and N-allyl cyanide or certain proportions of acrylonitrile and N-2-methallyl cyanide can be copolymerized to give high molecular weight resinous copolymers that are soluble in one or more volatile organic solvents, and that can be fashioned by conventional methods into flexible, continuous structure filaments of good strength, into flexible and tough sheet materials and more especially into molding compositions and shaped objects.

It is, accordingly, an object of my invention to provide a new class of resinous copolymers. A further object is to provide a new resinous copolymer from which high quality yarns can be made. A further object is to provide a new resinous copolymer from which high quality sheet materials and molded objects can be made. A further object is to provide a process for preparing such copolymers. Other objects will become apparent hereinafter.

In accordance with the invention, I prepare the new copolymers by polymerizing a mixture of monomeric acrylonitrile and monomeric N-allyl-cyanide or a mixture of monomeric acrylonitrile and monomeric N-2-methallyl cyanide. The polymerization is advantageously carried out in the presence of a polymerization catalyst, e. g., a peroxide polymerization catalyst. Peroxide polymerization catalysts which are soluble in the mixtures of monomers can be employed, e. g., organic peroxides such as benzoyl peroxide, acetyl peroxide, lauroyl peroxide, tertiary butyl hydro-peroxide, etc. Water-soluble peroxides can also be used, e. g., hydrogen peroxide, ammonium persulfate, potassium persulfate, sodium persulfate, persulfuric acid, the water-soluble salts of percarbonic acid, the water-soluble salts of perphosphoric acid, the water-soluble salts of sulfo-per-acid (Caro's acid). As water-soluble salts, the ammonium, potassium and sodium salts are especially suitable. Mixtures of the catalysts can be employed.

The polymerizations can be carried out in bulk (mass) in solvents or in heterogeneous dispersion where the mixture of monomers is dispersed in a non-solvent for the monomers, the particles of dispersed monomers being very small (emulsion) or relatively large (bead or granular). In bulk or mass polymerization, the organic peroxide catalysts are advantageously employed. In solvent polymerization, the organic peroxide catalysts are also advantageously employed. Suitable solvents include water, acetone, methyl ethyl ketone, methanol, ethanol, propanol, isopropanol, tertiary butyl alcohol, 1,4-dioxane, chloroform, carbon tetrachloride, naphtha (liquid saturated aliphatic hydrocarbons boiling from 60 to 100° C.), benzene, etc.

For emulsion polymerizations, any non-solvent for either the monomers or for the resulting copolymer can be employed, water being especially advantageous. Suitable emulsifying agents are compounds such as salts of higher fatty acids, e. g., sodium or potassium stearate, palmitate, etc., or ordinary soaps, salts of higher fatty alcohol sulfates, e. g., sodium or potassium lauryl sulfate, sodium or potassium di(2-ethylhexyl) sulphosuccinate, sodium or potassium dihexyl sulphosuccinate, sodium or potassium cetyl sulfate, sodium or potassium stearyl sulfate, etc., salts of aromatic sulfonic acids, e. g., sodium or potassium salts of alkylnaphthalene sulfonic acids, etc., higher molecular weight quaternary ammonium salts, e. g., dimethyl benzylphenyl ammonium salts containing the radical $C_{15}H_{31}$ and $C_{17}H_{35}$, etc. Mixtures of emulsifying agents can be employed. For bead or granular polymerization relatively poor dispersing agents such as starch, gum arabic, polyvinyl alcohol, partly hydrolyzed polyvinyl acetate, gelatin, sodium cellulose glycolate, etc., can be employed. Mixtures of dispersing agents can be employed. In the polymerizations wherein the mixture of monomers is dispersed in a non-solvent, or where the copolymers formed are insoluble in the polymerization mixture, the dispersion of the monomers or of the copolymer can be facilitated by stirring, shaking or tumbling the polymerization mixtures. In emulsion polymerization, the water-soluble polymerization catalysts are advantageously employed. The emulsions can be coagulated by the addition of an inorganic salt, for example, sodium sulfate. Heat accelerates all the polymerizations, a temperature range of 40 to 70° C. for a period of from several hours to 24 hours being advantageous. However, temperatures up to 100 to 110° C. can be employed, if desired. The amount of polymerization catalyst employed can vary within wide limits, but preferably from 0.1 to 5% by weight of the total monomers. Where the polymerization is carried out in a solvent, the concentration of the monomers can vary from 2 to 50 parts by weight of the monomers to from 98 to 50 parts by weight of solvent, but the best operating efficiency is obtained with a concentration of about 10 parts by weight of the monomers to 90 parts by weight of the solvent.

The copolymers of the invention advantageously contain not less than 2% and not more than 40% by weight of N-allyl cyanide or N-2-methallyl cyanide, the remainder being acrylonitrile units, but the most useful copolymers contain from 5 to 35% by weight of N-allyl or N-2-methallyl cyanide units and from 95 to 65% by weight of acrylonitrile units. The proportion of N-allyl or N-2-methallyl cyanide employed in the monomeric mixture has been found to be substantially the same in the polymeric material made from such mixture in accordance with my invention.

The following examples will serve to illustrate further the manner of obtaining my new copolymers.

Example 1

65 g. of acrylonitrile, 35 g. of N-allyl cyanide, 3 g. of sulfonated mineral oil, 1 g. of sodium persulfate and 400 cc. of water were mixed together and stirred at 55–60° C. for 6 hours to give an emulsion polymer. The emulsion was coagulated with sodium sulfate and the precipitated resin separated, washed with water and dried. A yield of 85–90 g. of white polymer was obtained. It analyzed 68% by weight of combined acrylonitrile, the remainder of the polymer being combined N-allyl cyanide. The polymer had a softening point above 160° C. and was especially useful as a molding plastic. It was soluble in dimethyl acetamide, gamma-butyrolactone and ethylene carbonate.

A polymer having generally similar properties was obtained by replacing the N-allyl cyanide in the above example with a like amount of N-2-methallyl cyanide. It contained substantially 65% by weight of combined acrylonitrile and 35% by weight of combined N-2-methallyl cyanide.

Example 2

80 g. of acrylonitrile, 20 g. of N-allylcyanide and 1.2 g. of acetyl peroxide were mixed together and heated at 65–70° C. for 12 hours. A hard, tough resin was obtained which analyzed approximately 80% by weight of combined acrylonitrile, the remainder being combined N-allyl cyanide. It had a softening point above 180° C. and was soluble in dimethyl acetamide, dimethyl formamide, and gamma-butyrolactone.

Example 3

80 g. of acrylonitrile, 20 g. of N-2-methallyl cyanide and 1.2 g. of acetyl peroxide were mixed together and heated at 65–70° C. for a period of 12 hours. A hard, tough resin was obtained which analyzed 80% by weight of combined acrylonitrile, the remainder being combined N-methallyl cyanide. It had a softening point above 180° C. and was soluble in dimethyl acetamide, dimethyl formamide, ethylene carbonate, and ethylene cyanohydrin.

Example 4

90 g. of acrylonitrile, 10 g. of N-allyl cyanide and 1.5 g. benzoyl peroxide were mixed together and heated at 60° C. for 18 hours. A hard, tough resin which could be granulated and used in molding compositions was obtained. The polymer contained substantially 90% by weight of combined acrylonitrile, the remainder being combined N-allyl cyanide. It had a softening point above 220° C. and was soluble in dimethyl acetamide and ethylene carbonate.

By substituting for the N-allyl cyanide in the above example by a like amount of N-methallyl cyanide, there can be produced a polymer having about the same acrylonitrile content and generally similar properties.

Other copolymers can also be prepared by proceeding as shown in the foregoing examples from monomeric mixtures containing, for example, 2% by weight of N-allyl or N-2-methallyl cyanides, 5% by weight of N-allyl or N-2-methallyl cyanides, 15% by weight of N-allyl or N-2-methallyl cyanides, 25% by weight of N-allyl or N-2-methallyl cyanides, 30% by weight of N-allyl or N-2-methallyl cyanides and 40% by weight of N-allyl or N-2-methallyl cyanides, the remainder being acrylonitrile in each case.

The copolymers made from monomeric mixtures containing from 5 to 35% by weight of N-allyl or N-2-methallyl cyanides, the remainder being acrylonitrile, are soluble in one or more volatile solvents such as succinonitrile, dimethyl formamide, dimethyl acetamide or in mixtures of these solvents or mixtures with acetonitrile, for example, 2 parts of acetonitrile to each part of dimethyl formamide. From viscous dopes in these solvents, the copolymers can be extruded through a spinneret into a cabinet or cell where the solvent is evaporated to give monofilaments which can be spun to yarn. Such viscous dopes can also be coated on a film-forming surface of metal or glass, for example, the solvent evaporated off and the resulting film stripped from the film-forming surface. The copolymers made from monomeric mixtures containing from 5 to 35% by weight of N-allyl or N-2-methallyl cyanides, the remainder being acrylonitrile, are especially useful for molding, with or without plasticizers, fillers, coloring matter, etc., by means of extrusion, injection or compression methods into shaped objects which can be worked into finished form by heat and mechanical means.

What I claim is:

1. A copolymer of from 60 to 98% by weight of acrylonitrile and from 40 to 2% by weight of a compound selected from the group consisting of N-allyl cyanide and N-2-methallyl cyanide.

2. A copolymer of from 65 to 95% by weight of acrylonitrile and from 35 to 5% by weight of N-allyl cyanide.

3. A copolymer of from 65 to 95% by weight of acrylonitrile and from 35 to 5% by weight of N-2-methallyl cyanide.

4. A copolymer of 65% by weight of acrylonitrile and 35% by weight of N-allyl cyanide.

5. A copolymer of 80% by weight of acrylonitrile and 20% by weight of N-allyl cyanide.

6. A copolymer of 80% by weight of acrylonitrile and 20% by weight of N-2-methallyl cyanide.

7. A process for preparing a copolymer of acrylonitrile and a compound selected from the group consisting of N-allyl cyanide and N-2-methallyl cyanide comprising heating a mixture containing from 60 to 98 parts by weight of acrylonitrile and from 40 to 2 parts by weight of a compound selected from the group consisting of N-allyl cyanide and N-2-methallyl cyanide, in the presence of a peroxide polymerization catalyst.

8. A process for preparing a copolymer of acrylonitrile and N-allyl cyanide comprising heating a mixture of from 65 to 95 parts by weight of acrylonitrile and from 35 to 5 parts by weight of N-allyl cyanide, in the presence of a peroxide polymerization catalyst.

9. A process for preparing a copolymer of acrylonitrile and N-2-methallyl cyanide comprising heating a mixture of from 65 to 95 parts by weight of acrylonitrile and from 35 to 5 parts by weight of N-2-methallyl cyanide, in the presence of a peroxide polymerization catalyst.

10. A process for preparing a copolymer of acrylonitrile and N-allyl cyanide comprising heating a mixture of 65 parts by weight of acrylonitrile and 35 parts by weight of N-allyl cyanide, in the presence of sodium persulfate and water.

11. A process for preparing a copolymer of acrylonitrile and N-allyl cyanide comprising heating a mixture of 80 parts by weight of acrylonitrile and 20 parts by weight of N-allyl cyanide, in the presence of acetyl peroxide.

12. A process for preparing a copolymer of acrylonitrile and N-2-methallyl cyanide comprising heating a mixture of 80 parts by weight of acrylonitrile and 20 parts by weight of N-2-methallyl cyanide, in the presence of acetyl peroxide.

JOHN R. CALDWELL.

No references cited.